United States Patent Office 2,957,875
Patented Oct. 25, 1960

2,957,875

DERIVATIVES OF PURINE

Douglas A. Lyttle and Harold G. Petering, Kalamazoo, Mich., assignors to The Upjohn Company, Kalamazoo, Mich., a corporation of Michigan No Drawing. Filed Nov. 18, 1957, Ser. No. 696,944

3 Claims. (Cl. 260—252)

This invention relates to novel organic compounds, and to a process for preparing them. It is more particularly directed to 6-[bis(2-haloethyl)amino]purines, to a 6-[bis(2-hydroxyethyl)amino]purine intermediate, and to a process for preparing the same.

The 6-[bis(2-haloethyl)amino]purines of this invention have the following general structural formula:

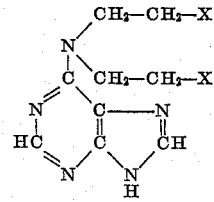

wherein X is a halogen atom having an atomic weight between 35 and 127.

The compounds of this invention are useful in the control of certain yeasts such as *Torula albida* and *Kloeckera brevis*; and in the control of fungal pathogens such as *Microsporum canis* and *Trichophyton interdigitalis*. They are also phytotoxic and useful for the control of weeds. Moreover, their mutagenic character provides controllable means for inducing mutations in useful microorganisms such as antibiotic-producing or acid-producing organisms such as Streptomyces, Penicillium, and Aspergillae where more productive strains are continually being sought. Since the rate of gene mutation is accelerated, and therefore the chance of an improved strain occurs more frequently than under natural conditions, the selective process is enhanced.

The compounds of the invention can be prepared by introduction of a bis(2-hydroxyethyl)amino group at the 6-position of purine, followed by halogen substitution of the hydroxyl groups. The compounds are conveniently prepared by treating 6-aminopurine (adenine) with a 2-hydroxyethylating agent such as ethylene oxide or ethylene halohydrin, such as ethylene chloro- or bromohydrin, to to produce the 6-[bis(2-hydroxyethyl)amino]purine intermediate.

This intermediate can also be prepared by condensing purine having a leaving group in the 6-position such as 6-chloropurine, 6-bromopurine, 6-mercaptopurine, 6-methylmercaptopurine, 6-ethylmercaptopurine, 6-carboxymethylmercaptopurine, or a sulfonate ester leaving group, such as 6-mesyloxypurine, 6-tosyloxypurine, or 6-brosyloxypurine, and the like, with diethanolamine.

Halogen substitution of the bis(2-hydroxyethyl)amino intermediate is accomplished by methods commonly known in the art. For example, a halogenating agent such as thionyl chloride or thionyl bromide, preferably in the presence of an inert solvent, reacts with said intermediate to yield the 6-[bis(2-chloroethyl)amino]purine or 6-[bis(2-bromoethyl)amino]purine. Other halogenating agents can be used such as phosphorus trichloride or tribromide, phosphoryl chloride or bromide, and phosphorus pentachloride or pentabromide. Suitable inert solvents for the halogenation reaction include chloroform, benzene, toluene, diethylene glycol, dimethyl ether, xylene, dimethylformamide, and the like. The iodine analogue, i.e., 6-[bis(2-iodoethyl)amino]purine, is prepared by a metathetic reaction using an alkali-metal iodide such as sodium or potassium iodide with either 6-[bis(2-chloroethyl)amino]purine or, preferably, 6-[bis(2-bromoethyl)amino]purine.

The following examples are illustrative of the process and products of the present invention, but are not to be construed as limiting.

EXAMPLE 1

A. Preparation of 6-[bis(2-hydroxyethyl)amino]purine

A mixture of 10.7 grams (0.069 mole) of 6-chloropurine, 25 milliliters of diethanolamine, 1.2 milliliters of concentrated hydrochloric acid, and 130 milliliters of ethanol was placed in a flask fitted with a condenser and refluxed. The 6-chloropurine dissolved rapidly on heating; and after about two hours, a white crystalline solid began to precipitate. When the reaction was substantially completed (after about four hours), the mixture was cooled; and the white crystalline solid was collected by filtration. This solid was then washed with cold ethanol and dried under reduced pressure, yielding 14.35 grams (a 93 percent yield) of 6-[bis(2-hydroxyethyl)amino] purine having a melting point of 228.5 to 231 degrees centigrade (corrected). A small sample was recrystallized once from water giving plates which melted at 229 to 229.5 degrees centigrade (corrected).

Analysis.—Calc'd for $C_9H_{13}N_5O_2$: C, 48.42; H, 5.87; N, 31.37. Found: C, 48.67; H, 5.60; N, 30.78.

B. Preparation of 6-[bis(2-chloroethyl)amino]purine

Ten grams (0.045 mole) of 6-[bis(2-hydroxyethyl)-amino] purine was suspended in fifty milliliters of dry, alcohol-free chloroform and 100 milliliters of thionyl chloride was gradually added with stirring. After reaction had subsided, the mixture was refluxed for four hours. Most of the chloroform and excess thionyl chloride were removed by distillation under reduced pressure. A white solid remained which was slurried with 150 milliliters of benzene and recovered by filtration. The material was washed with benzene and then dried over sodium hydroxide under reduced pressure. After recrystallization from 350 milliliters of obsolute ethanol, 9.62 grams (82.5 percent yield) of 6-[bis(2-chloroethyl)-amino]purine was recovered, having a corrected melting point of 250–252 degrees centigrade (decomposition). A small sample was recrystallized by dissolving in ethanol, adding benzene until the solution became cloudy, and then storing in the refrigerator overnight. The purified 6-[bis(2-chloroethyl)amino]purine thus obtained had a corrected melting point of 253 to 255 degrees centigrade (decomposition).

Analysis.—Calcd. for $C_9H_{11}Cl_2N_2N_5$: C, 51.55; H, 4.26; N, 26.92; Cl (total) 27.26; Cl (ionic) 13.63. Found: C, 41.77; H, 4.65; N, 26.29; Cl (total) 27.28; Cl (ionic) 13.74.

According to the foregoing analytical data, the compound has one ionic chlorine atom. It is believed that the 6-[bis(2-haloethyl)amino]purines of this invention undergo an internal quaternization involving one of the 2-haloethyl groups and one or the other of the purine ring nitrogens in either position 1 or 7 to produce a compound having the following general structural formula:

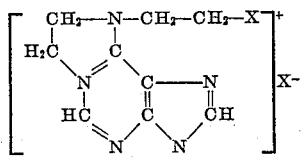

or

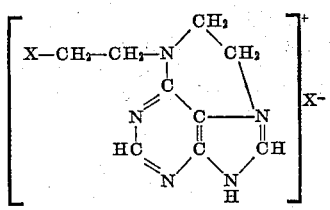

wherein X is a halogen atom.

EXAMPLE 2

*Preparation of 6-[bis(2-bromoethyl)amino]purine.*

Following the procedure of Example 1, part B, but substituting thionyl bromide for thionyl chloride, 6-[bis(2-bromoethyl)amino]purine was prepared.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. 6-[bis(2-haloethyl)amino]purine wherein "halo" represents a halogen atom having an atomic weight between 35 and 127.
2. 6-[bis(2-chloroethyl)amino]purine.
3. 6-[bis(2-hydroxyethyl)amino]purine.

References Cited in the file of this patent
UNITED STATES PATENTS
2,844,577    Acker _____ July 22, 1958

OTHER REFERENCES

Elion et al.: Jour. Amer. Chem. Soc., vol. 74, pp. 411–414 (1952).

Whitmore: Organic Chemistry, 2nd edition, p. 74 (1952).

UNITED STATES PATENT OFFICE
CERTIFICATION OF CORRECTION

Patent No. 2,957,875                          October 25, 1960

Douglas A. Lyttle et al.

It is hereby certified that error appears in the above numbered patent requiring correction and that the said Letters Patent should read as corrected below.

Column 1, line 53, strike out "to"; column 2, line 51, for "obsolute" read -- absolute --; line 61, for "$C_9H_{11}Cl_2N_2N_5$" read -- $C_9H_{11}Cl_2N_5$ --; line 61, for "C, 51.55" read -- C, 41.55 --; column 3, lines 6 to 9, for

Signed and sealed this 9th day of May 1961.

(SEAL)
Attest:

ERNEST W. SWIDER
Attesting Officer

DAVID L. LADD
Commissioner of Patents